S. T. FREAS.
DETACHABLE SEGMENT SAW.
APPLICATION FILED OCT. 3, 1917.
1,274,255.
Patented July 30, 1918.
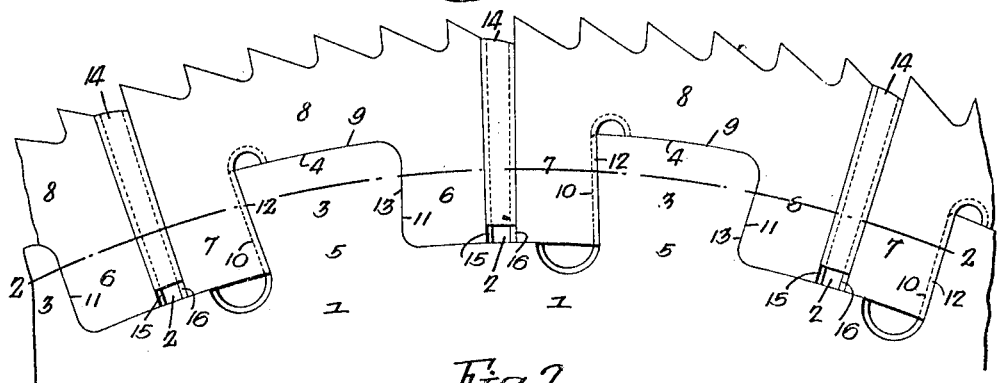
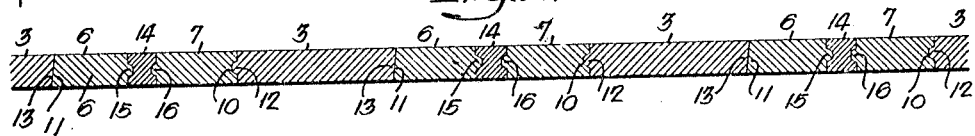
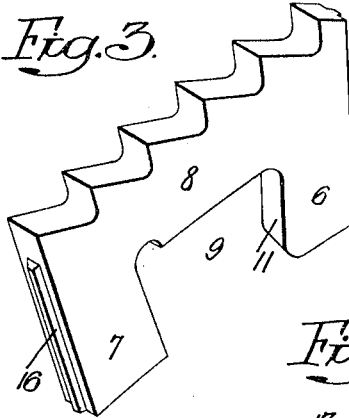
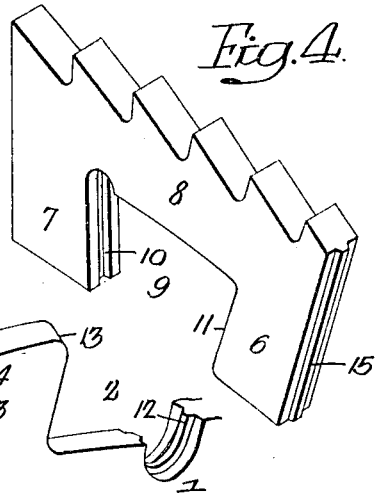
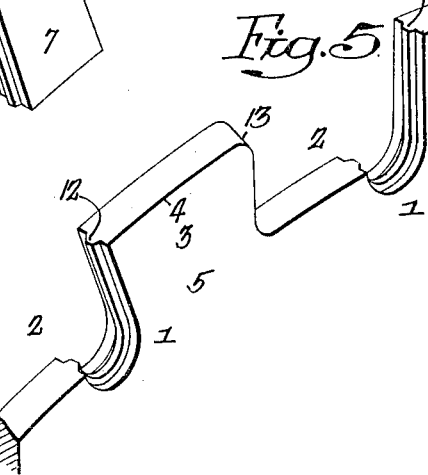
Inventor -
Samuel T. Freas.
by his Attorneys.

UNITED STATES PATENT OFFICE.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

DETACHABLE-SEGMENT SAW.

1,274,255.  Specification of Letters Patent.  Patented July 30, 1918.

Application filed October 3, 1917. Serial No. 194,513.

*To all whom it may concern:*

Be it known that I, SAMUEL T. FREAS, a citizen of the United States, residing in Trenton, Mercer county, New Jersey, have invented certain Improvements in Detachable-Segment Saws, of which the following is a specification.

This invention relates to certain improvements in circular saws of the type in which the teeth are detachable. Heretofore, in saws particularly adapted for sawing metal, comparatively large teeth were used and these teeth were necessarily spaced a considerable distance apart so as to provide sufficient strength in the blade. This made the saw undesirable for cutting light material such as tubing, rails and structural steel which requires small spacings of teeth. This has usually been accomplished by cutting the teeth directly on the blade. This is expensive since when the teeth break the saw either has to be discarded or recut, in the present instance it is only necessary to drive out the wedge and substitute a new section.

The object of my invention is to make an insertible section for a saw having a series of teeth, and the means of fastening the segments is such that the teeth are practically continuous around the periphery of the saw.

In the accompanying drawing:—

Figure 1, is a portion of a circular saw showing a series of toothed sections secured thereto;

Fig. 2, is a sectional plan view on the line 2—2, Fig. 1;

Figs. 3 and 4, are detached perspective views of the toothed sections; and

Fig. 5, is a perspective view of a portion of the blade.

Referring to the drawing, 1 is the blade having recesses 2 spaced apart, forming peripheral projections 3, undercut as shown, being wider at the outer edge 4 than at the base 5. These sections are spaced a sufficient distance apart as to allow for the insertion of the adjoining extensions 6 and 7 of the toothed sections 8. These sections are formed by cutting an undercut recess 9 in the toothed section, as illustrated in Fig. 3.

The inner wall of the extension 7 of each toothed section has a groove 10 therein, while the inner wall 11 of the extension 6 is beveled, as clearly shown in Fig. 2. On one edge of the projections 3 is a rib 12 adapted to the groove 10 and the other edge 13 of the extension is beveled to correspond to the bevel of the beveled face 11 of the toothed section 8, so that when the toothed sections are placed in position they are first placed over the rib 12 and moved laterally so that the beveled surface 11 comes in contact with the beveled face 13 of the projection 3, as clearly shown in Fig. 2.

The extension 7 of one tooth is some distance from the extension 6 of an adjoining toothed section and, in order to lock the two toothed sections together, I provide wedges 14. Each side of each wedge is grooved for the reception of the ribs 15 and 16 on the extensions 6 and 7 of the adjoining toothed sections, as clearly shown in the drawing, so that when the wedges are driven they retain the toothed sections rigidly in position as they are held from lateral movement by the several ribs and they cannot move radially as they are adapted to the undercut projections of the blade.

It will be noticed that the wedges are comparatively narrow and the teeth are preferably so proportioned and are of such a size that they are uninterruptedly continued throughout the periphery of the saw, the outer end of each wedge forming the throat of one of the teeth. In the present instance, there are six teeth on each section 8, but it will be understood that the number and the shape of the teeth may be varied as desired.

I claim:—

1. The combination in a saw, of a blade having a series of undercut beveled projections; toothed segmental sections having extensions, the adjoining extensions of each section being located in the space between two of the projections of the blade; and a long wedge extending from a point near the periphery of the saw to the base of the space between the two projections of the blade so as to lock the sections firmly together and to the blade.

2. The combination in a saw, of a blade having undercut projections spaced apart, one wall of each projection being beveled laterally, the other wall having a rib thereon; a series of sections, each section having a series of teeth thereon; and long wedges driven between the toothed sections and of such a width that the teeth are substantially continuous throughout the full diameter of the saw.

3. The combination in a circular saw, of a blade having projections on its periphery spaced apart, each projection having a beveled undercut portion and having on one edge a rib and on the other a transverse bevel; a series of sections having teeth, each section having an undercut recess forming extensions at each edge of the said toothed section, each extension having an extended rib, the extensions of the adjoining toothed sections being located in one of the spaces between the projections on the blade; and a long wedge recessed at each side adapted to be driven between the adjoining toothed sections so as to force them against the projections on the blade, the wedge extending to a point on or about a line of the base of the teeth.

4. The combination in a circular saw, of a blade having a series of projections spaced apart and undercut; a series of toothed sections each having a series of small teeth thereon, each section being recessed to receive a projection of the blade; and a narrow wedge extending substantially the full depth of the sections and spaced between each section so that when the wedges are driven the sections are supported and also firmly held on the projections of the blade, the ends of the wedges forming the bases of the gullets of some of the teeth.

In witness whereof I affix my signature.

SAMUEL T. FREAS.

Copies of this patent may be obtained for five cents each, by addressing the "Commissioner of Patents, Washington, D. C."